United States Patent
Hanson et al.

[15] 3,699,570
[45] Oct. 17, 1972

[54] TACAN GROUND STATION TRACK AND DISPLAY SYSTEM

[72] Inventors: Donald W. Hanson; Ralph W. Mifflin, both of Rome, N.Y.

[73] Assignee: The United States of America as represented by the Secretary of the Air Force

[22] Filed: Sept. 10, 1970

[21] Appl. No.: 70,969

[52] U.S. Cl............343/6 R, 343/6.5 R, 343/112 TC
[51] Int. Cl.................................................G01s 9/56
[58] Field of Search.............343/6 R, 6.5 R, 112 TC

[56] References Cited

UNITED STATES PATENTS 3,055,001   9/1962   Ricketts...................343/6.5 R

Primary Examiner—T. H. Tubbesing
Attorney—Harry A. Herbert, Jr. and Willard R. Matthews, Jr.

[57] ABSTRACT

A lightweight secondary ground radar type function is achieved by modification of standard TACAN equipment. Participating aircraft range and angle information is derived at the ground station from modified aircraft to ground station TACAN signals. This eliminates the need for a separate data link. The technique comprehends triggering the airborne TACAN transponder with the received North burst and transmitting from the aircraft time coded signals which indicate bearing of the plane from the TACAN ground site. The technique permits the ground station to compute several aircraft positions and display them as a radar type of presentation.

1 Claim, 2 Drawing Figures

TACAN GROUND STATION TRACK AND DISPLAY SYSTEM

BACKGROUND OF THE INVENTION

This invention relates to TACAN navigation systems and in particular to modifications thereto that permit the tracking and displaying of all participating aircraft at the TACAN ground beacon station.

Complex and costly radar systems are currently used to accomplish aircraft ground tracking and to provide airborne navigation terminal area control. TACAN is a widely used navigation system that provides position information to participating aircraft. Such a system, however, does not provide aircraft position information to the TACAN ground station. In the past, this information has been provided by means of separate radar systems, or in some cases, a data link from air-to-ground allows the aircraft to transmit his position to a ground plotter. There is currently a need, therefore, for a lightweight secondary ground radar function that can be used in conjunction with and will not interfere with normal TACAN operations. Such a system would be primarily advantageous for lightweight tactical ground use where radar facilities are not practical or normally available.

SUMMARY OF THE INVENTION

The present invention comprehends a unique system that utilizes modified TACAN equipment and additional circuitry to allow the TACAN signal to be efficiently used for ground tracking and display of TACAN equipped aircraft on a typical ground radar P.P.I. or other type of display. This is accomplished without the use of a radar transmitter-receiver. The triggering of the airborne TACAN transponder on receipt in the aircraft of each North burst, plus the transmission by the airborne transponder of time coded pulses which indicate bearing of the airplane from the ground TACAN site, permits the ground station to determine the relative location of the aircraft by using timing and decoding circuits on the signals. The ground TACAN station is thus utilized as a complete radar tracking and display station for all modified airplanes. Only simple add-on modifications to the airborne equipment are required.

It is a principal object of the invention to provide new and improved methods and means for tracking and displaying participating aircraft at the ground beacon station of a TACAN navigation system.

It is another object of the invention to provide in conjunction with a TACAN navigation system a lightweight secondary ground radar type function that does not interfere with normal TACAN operations.

It is another object of the invention to provide a TACAN navigation system having a ground station track and display capability that does not require a separate data link.

These, together with other objects, advantages and features of the invention, will become more apparent from the following detailed description when taken in conjunction with the illustrated embodiment in the accompanying drawings.

DETAILED DESCRIPTION OF THE PREFERRED EMBODIMENT

Standard TACAN is a polar coordinate navigation system in which a single ground station signal provides both bearing and distance information. The system includes pulse-emitting beacon or ground transmitters and mobile station receivers, such as, for example, those carried on airplanes.

The TACAN ground beacon operates at a frequency of from 962 to 1,024 and 1,151 to 1,213 megahertz, where it emits pulse pairs. Each pulse has a duration of about 3½ microseconds and the time between pulses of a pair is 12 thru and the time between pulses of a pair is 12 microseconds. Transmission occurs on one megacycle channels; a total of 126 ground-to-air channels is provided. A total of 2,700 pairs of pulses per second is emitted randomly for DME purposes. In addition, another 900 pairs of pulses (per second) are transmitted to serve as directional references (one north burst and eight auxiliary reference bursts). The emitted pulses are radiated by means of a nondirectional antenna around which two cylinders carrying parasitic elements rotate at a speed of 900 rpm. The inner cylinder carries a single parasitic element while the outer cylinder carries thru single parasitic element while the outer cylinder nine parasitic elements. In space, there is generated a rotating cardiod pattern distorted with nine lobes.

The TACAN receiver output consists of pulses having amplitude variations corresponding to a 15 cycle wave with a pronounced ninth harmonic. When the 135 cycle harmonic is extracted and compared with the auxiliary reference bursts marking the 40° sectors, a highly precise indication of bearing is obtained which is ambiguous, however, in that the particular 40° sector to which it applies is not known. The extracted 15 cycle signal provides the indication necessary to resolve the ambiguity. Bearing is displayed on a meter which automatically indicates bearing without ambiguity.

The standard TACAN airborne equipment also contains a pulse transmitter which continuously transmits pulse pairs on one of the 126 channels in the band of from 1,025 to 1,150 megahertz. These pulses are transmitted at a rate of 150 per second when search in time for the reply is in process, or 30 pairs per second when the reply has been received and is being tracked. These pulses are received at the ground station and retransmitted via the ground equipment previously mentioned. Pulses sent out in response to an airborne interrogation replace random pulses so that the total number transmitted is constant. When the pulses are returned to the receiver, the total time of transmit is measured and an automatic circuit converts time to slant distance which is then indicated on a standard aircraft instrument. At intervals, the ground station pulses sent out are regularized and grouped at a frequency of 1,350 hertz and keyed with the Morse code to identify the station.

Figure 1:
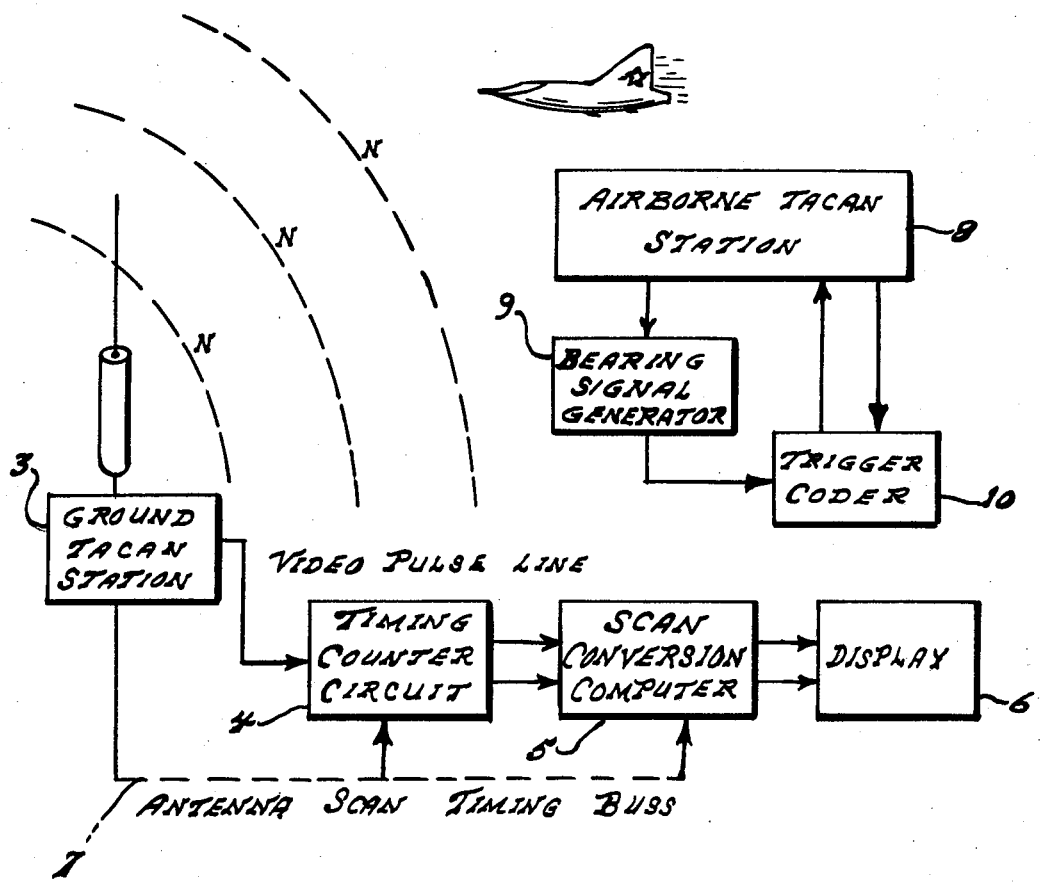
FIG. 1 is a block diagram of one presently preferred embodiment of the invention.

The present invention can be practiced by modifying a standard TACAN system in a manner illustrated in FIG. 1. In each participating aircraft the standard airborne TACAN station 8 is modified to include a bearing signal generator 9 and a trigger coder 10. The ground station TACAN station 3 is modified to include timing counter circuit 4, scan conversion computer 5, display means 6, and antenna scan timing buss 7.

Figure 2:
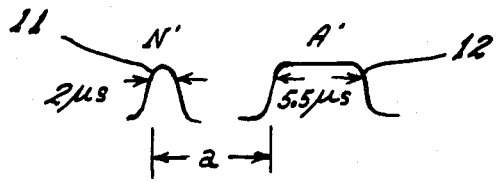
FIG. 2 illustrates typical signal pulses of the type generated by operation of the embodiment of the invention shown in FIG. 1.

In operation, an aircraft arriving in the service area of ground TACAN station 3 (normally out to 100 miles radius) begins receiving the North pulse groups. The additional timing counter circuit 4 begins counting when the ground station sends out a North burst. The trigger and coder circuit 10 triggers the standard airborne TACAN transmitter when the North burst is received. Normal TACAN pulses are 3.5 microseconds. A narrow 2 microsecond North response pulse (pulse 11, N' of FIG. 2) is transmitted back to the ground station. This narrow pulse distinctively indicates it is associated with airborne receipt of the North burst.

A distinctively longer bearing response pulse of 5.5 microseconds (pulse 12, A' of FIG. 2) is then sent from the aircraft which contains the information pertaining to the bearing of the aircraft from the TACAN ground station. This information is obtained from the standard TACAN display circuitry in the airplane and applied to the pulse delay coder/trigger 10 via bearing signal generator 9. The actual bearing information is converted and contained in the time interval between the North response and the bearing response. This is illustrated by delay time "a" of FIG. 2. Timing counter circuit 4 senses and computes the time of arrival of the narrow North response pulse N' from the aircraft, and computes the range. It also controls the scan conversion computer 5 and the display circuitry to display the range appropriately depending on the type of display being utilized. The counter circuit 4 continues to count and senses the arrival of the other unique (long) pulse response A' from the aircraft. The difference in time of receipt of N' and A' is computed by the counter circuit. This time is converted to an equivalent angle and appropriate interface signals are developed by the scan conversion computer 5 to feed the display 6.

Having the range and angle of the aircraft, a typical radar display can be utilized to display this information on a plan position indicator (P.P.I.) presentation hence, a secondary radar function is obtained without the use of additional transmitters/receivers and no skin or airframe modification to the aircraft. Several TACAN equipped aircraft can be displayed simultaneously without significant ambiguities by the use of multiple timing counters and gating circuitry to insure angle return A' will be displayed only when received at the proper range interval associated with the companion North burst N'. This can also be accomplished by additional circuitry in the timing counter circuit 4 and the scan conversion computer 5. These circuits use standard designs or modules well known in the art. The antenna scan timing buss 7 is used to insure that the additional circuitry is synchronized where necessary with the normal TACAN antenna scan function.

While the invention has been described in its preferred embodiment, it is understood that the words which have been used are words of description rather than words of limitation and that changes within the purview of the appended claims may be made without departing from the scope and spirit of the invention in its broader aspects.

What is claimed is:

1. In combination with a TACAN navigation system having a ground beacon station and a plurality of airborne stations, a display system for displaying participating aircraft comprising:

in each participating aircraft;
   means for coding its position information comprising a bearing signal generator responsive to the standard airborne position indicator output in combination with a trigger coder being adapted to generate, in response to the output of said bearing signal generator, discrete pulses having time coded relationships to pulses of the standard airborne station to ground station TACAN signal, and means for transmitting said coded position information to said ground beacon station; and in said ground beacon station,
   means for receiving and decoding said coded position information, said means for decoding coded position information comprising a timing counter circuit in combination with a scan conversion computer, said combination being adapted to compute the difference in time of receipt of standard aircraft to ground station TACAN signal pulses and said discrete pulses and generate a position information signal therefrom, and means for displaying said decoded position information.

* * * * *